United States Patent
Belotserkovsky et al.

(10) Patent No.: US 6,621,857 B1
(45) Date of Patent: Sep. 16, 2003

(54) CARRIER TRACKING LOOP FOR DIRECT SEQUENCE SPREAD SPECTRUM SYSTEMS

(75) Inventors: Maxim B. Belotserkovsky, Indianapolis, IN (US); Dong-Chang Shiue, Carmel, IN (US); Paul Gothard Knutson, Indianapolis, IN (US); Kumar Ramaswamy, Indianapolis, IN (US)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/476,641

(22) Filed: Dec. 31, 1999

(51) Int. Cl.[7] .............................................. H04B 1/707
(52) U.S. Cl. ...................................... 375/149; 375/150
(58) Field of Search ................................ 375/140, 142, 375/143, 144, 145, 148, 149, 150, 152

(56) References Cited

U.S. PATENT DOCUMENTS

| | | | | |
|---|---|---|---|---|
| 4,599,732 A | * | 7/1986 | LeFever | 375/346 |
| 5,712,870 A | * | 1/1998 | Petrick | 370/206 |
| 5,721,555 A | * | 2/1998 | Lennen | 342/352 |
| 5,808,582 A | * | 9/1998 | Woo | 342/357.12 |
| 5,943,363 A | * | 8/1999 | Hanson et al. | 342/464 |

* cited by examiner

*Primary Examiner*—Don N. Vo
(74) *Attorney, Agent, or Firm*—Joseph S. Tripoli; Harvey D. Fried; Joseph J. Kolodka

(57) ABSTRACT

A wireless telephone system comprises a base transceiver having a base receiver and a plurality of wireless handsets. Each handset comprises a handset transceiver for establishing a DSSS link over a shared channel with the base unit via the base transceiver. Each receiver the base transceiver and the handset transceivers receives a spread-spectrum signal representing symbol data from a transmitter of the system, where each such receiver comprises a derotator that derotates the spread-spectrum signal in accordance with a counter-rotating signal to provide a derotated signal; a correlator for receiving the derotated signal and for providing output symbol data based on the derotated signal; a carrier tracking loop (CTL) phase error estimator for receiving the output symbol data and for generating a CTL phase error signal based upon the rotation of the spread-spectrum signal; and a CTL for generating the counter-rotating signal based on the CTL phase error signal.

9 Claims, 4 Drawing Sheets

700

CARRIER TRACKING LOOP FOR DIRECT SEQUENCE SPREAD SPECTRUM SYSTEMS

BACKGROUND OF THE INVENTION

1. Field of the Invention

The present invention relates to carrier tracking loops (CTLs) and, in particular, to CTLs for use in direct sequence spread spectrum (DSSS) systems.

2. Description of the Related Art

Digital data transmission from a transmitter to a receiver requires a variety of digital signal processing techniques to allow the data to be transmitted by the transmitter and successfully recovered or acquired by the receiver. In digital wireless telephone systems, for example, a wireless (cordless) telephone handset unit communicates via digital radio signals with a base unit, which is typically connected via a standard telephone line to an external telephone network. Each handset and the base comprise a transceiver, having a transmitter and receiver. In such a system, a user may employ the wireless handset to engage in a telephone call with another user through the base unit and the telephone network.

Multi-line wireless telephone systems are in use in various situations, such as businesses with many telephone users. Such systems employ a base unit that communicates with up to N handsets in real time, typically with digital communications schemes, such as a spread-spectrum, time division multiplex (TDM) schemes such as time division multiple access (TDMA). In a spread spectrum system, bandwidth resources are traded for performance gains, in accordance with the so-called Shannon theory. The advantages of a spread-spectrum system include low power spectral density, improved narrowband interference rejection, built-in selective addressing capability (with code selection), and inherent channel multiple access capability. Spread-spectrum systems employ a variety of techniques, including direct sequencing or sequence (DS), frequency hopping (FH), chirp systems, and hybrid DS/FH systems. DS spread spectrum systems are sometimes referred to as DSSS systems.

In a TDMA system, a single RF channel is used, and each handset transmits and receives audio data packets as well as non-audio data packets during dedicated time slices or time slots within an overall TDMA cycle or epoch. Other communications schemes include frequency division multiple access (FDMA), code division multiple access (CDMA), and combinations of such schemes. Various modulation schemes are employed, such as carrierless amplitude/phase (CAP) and quadrature amplitude modulation (QAM).

Digital data is typically transmitted as modulated signals over a transmission medium, such as the RF channel. (Other transmission media often used for digital communications include asymmetric digital subscriber loop (ADSL) systems or cable modem systems.) The digital data, in the form of a stream of binary digits (bits), is first mapped to a stream of symbols, each of which may represent multiple bits. A constellation is the set of all possible symbols for a given signaling scheme. Symbols can be a set of real amplitude levels, as in pulse amplitude modulation (PAM), or a set of points on a circle in the complex plane such as in quadrature phase shift keying (QPSK: 4 points on a circle, separated by 90 degrees of phase), or an array of points at different amplitudes and phases on the complex plane, as in QAM. Sets of bits are mapped to symbols by a look-up table (e.g., a ROM). The number of symbols in a signaling constellation depends on the encoding scheme. For example, each QPSK symbol represents 2 bits of the input data stream, with the 4 symbols, $1+j$, $1-j$, $-1+j$, $-1-j$ each representing the bit patterns 00, 01, 10, and 11, respectively. The real portion of such complex digital symbols is referred to as in-phase, or "I" data, and the imaginary part as quadrature, or "Q" data, yielding I, Q pairs.

To transmit a given input data value in a complex data system, the input data value to be transmitted is mapped to a symbol pair or pair of coordinates I,Q of a corresponding constellation point on a complex signal constellation having real and imaginary axes I and Q. These I,Q symbols, which represent the original data value, are then transmitted as part of data packets by a modulated channel. A receiver can recover the I, Q pairs and determine the constellation location therefrom, and perform a reverse-mapping to provide the original input data value or a close approximation thereof.

In a DSSS type spread spectrum system, each symbol is transmitted by a string of "sub-symbols" or "chips", which is typically derived by multiplying the symbol (which may be either a 1 or $-1$, in some schemes) times a pseudo-random number (PN) binary string of a certain length (number of chips C). Such systems are thus characterized by a chip rate, which is related to the symbol rate. Spread spectrum systems may also be used, in general, to transmit any digital data, whether in complex format or not, and whether or not in a TDMA system.

Thus, in a DSSS system, a signal represents successive symbols, by means of successive "chips" of symbols. A received signal is sampled to provide samples. Samples thus represent a signal, which itself represents chips, which represent symbols.

The receiver side of a transceiver samples a received signal with an analog-to-digital converter (ADC), which provides samples representative of the signal, which in turn represents symbols. The transmitter side of a transceiver converts symbols into analog samples that constitute a signal, with a digital-to-analog converter (DAC).

As noted above, digital data transmission requires a variety of digital signal processing techniques to allow the data to be transmitted by the transmitter (e.g., the transmitter of the base unit transceiver) and successfully recovered by the receiver (e.g., the receiver of a given handset transceiver). For example, the receiver side of a data transmission in a spread-spectrum digital wireless telephone systems employs a variety of functions to recover data from a transmitted RF signal. These functions can include: timing recovery for symbol synchronization, carrier recovery (frequency demodulation), and gain. The receiver thus includes, inter alia, an automatic gain control (AGC) loop, carrier tracking loop (CTL), and timing loop for each link.

Timing recovery is the process by which the receiver clock (timebase) is synchronized to the transmitter clock. This permits the received signal to be sampled at the optimum point in time to reduce the chance of a slicing error associated with decision-directed processing of received symbol values. In some receivers, the received signal is sampled at a multituple of the transmitter symbol (or chip) rate. For example, some receivers sample the received signal at twice the transmitter symbol (or chip) rate. In any event, the sampling clock of the receiver must be synchronized to the symbol clock of the transmitter. Carrier recovery is the process by which a received RF signal, after being frequency shifted to a lower intermediate passband, is frequency shifted to baseband to permit recovery of the modulating baseband information. AGC tracks signal strength and adjusts the gain, for example to help compensate for the effects of transmission channel disturbances upon the received signal. AGC, along with other equalization techniques, can help remove intersymbol interference (ISI) caused by transmission channel disturbances. ISI causes the value of a given symbol to be distorted by the values of preceding and following symbols. These and related functions, and related modulation schemes and systems, are discussed in greater detail in Edward A. Lee & David G. Messerschmitt, *Digital Communication*, 2d ed. (Boston: Kluwer Academic Publishers, 1994).

In a burst mode or TDMA communication system, such as a TDMA-based multi-line wireless telephone system, quick acquisition of carrier loops is required to efficiently utilize available bandwidth. For example, a TDMA-based digital multi-line wireless telephone system may use a TDMA audio packet structure such as structure 200 illustrated in FIG. 2, where a base unit having a transceiver sequentially transmits to and receives from different handsets over the time interval Td, with guard time Tg between packet transmissions. Guard time is established to allow the transmitters to power-down and to allow the receivers to power-up. The receivers must synchronize for each packet. During synchronization, data is unreliable, so the system bandwidth efficiency is reduced because of time being used to synchronize the system. It is, therefore, inportant to minimize or reduce this synchronization time, i.e. to provide for quicker acquisition of carrier loops.

Thus, in a DSSS multiline wireless telephone system, as in all spread spectrum systems, it is important for each transceiver in the system to be able to accurately and quickly receive transmitted signals and, in particular, to provide for accurate and quick carrier tracking. There is, therefore, a need for improved techniques for carrier tracking in spread spectrum communications systems and, therefore, for improved CTLs and CTL techniques.

SUMMARY

A wireless telephone system comprises a base transceiver having a base receiver and a plurality of wireless handsets. Each handset comprises a handset transceiver for establishing a DSSS link over a shared channel with the base unit via the base transceiver. Each receiver the base transceiver and the handset transceivers receives a spread-spectrum signal representing symbol data from a transmitter of the system, where each such receiver comprises a derotator that derotates the spread-spectrum signal in accordance with a counter-rotating signal to provide a derotated signal; a correlator for receiving the derotated signal and for providing output symbol data based on the derotated signal; a carrier tracking loop (CTL) phase error estimator for receiving the output symbol data and for generating a CTL phase error signal based upon the rotation of the spread-spectrum signal; and a CTL for generating the counter-rotating signal based on the CTL phase error signal.

DESCRIPTION OF THE PREFERRED EMBODIMENT

In the present invention, error from a decision based carrier tracking loop (CTL) in the receiver's demodulator is used to update the chip rate oscillator in one chip period as opposed to over the entire symbol period. This increases the likelihood of valid correlation over the next symbol period since the numerically controlled oscillator (NCO) of the CTL is not changing phase or frequency during the correlation period; instead, NCO changes occur between correlations.

Figure 1:
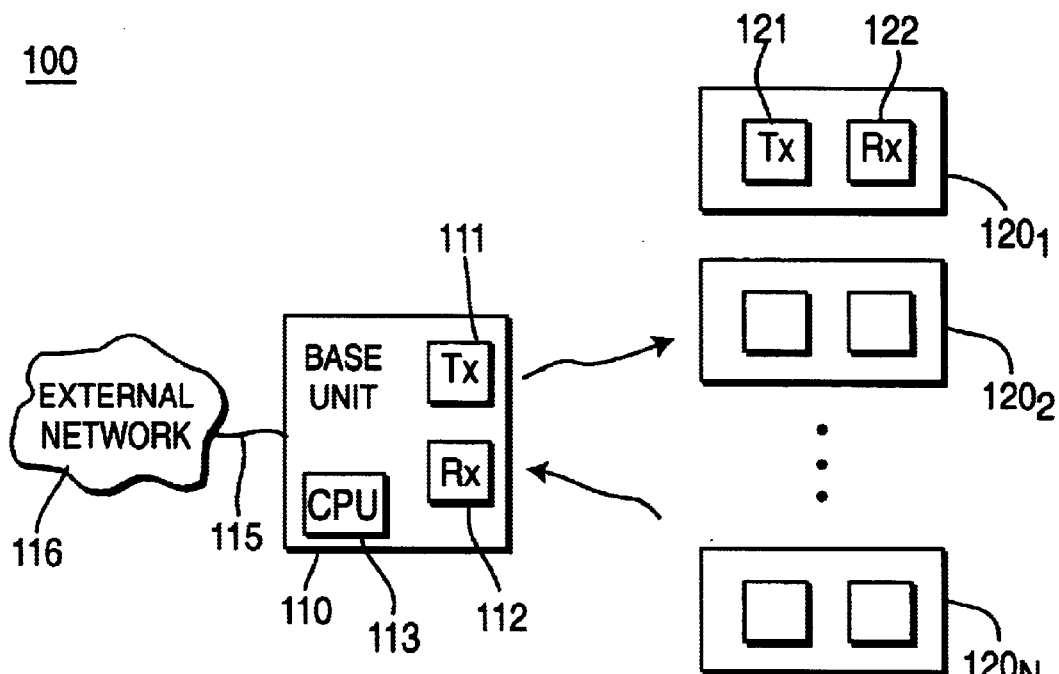
FIG. 1 is a block diagram of TDMA multi-line digital wireless telephone system, in accordance with an embodiment of the present invention.

Referring now to FIG. 1, there is shown a block diagram of spread spectrum TDMA multi- line digital wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1, 120_2, \ldots 120_N$. Each has a transmitter and receiver unit (tnansceiver), such as transmitter 121 and receiver 122 of handset $120_1$. In one embodiment, receiver unit 112 comprises N separate receivers, and transmitter unit 111 comprises N separate transmitters, so that receiver and transmitter units 112 and 111 provide N total transceiver units, one for each of N wireless handsets. At any given time, M handsets ($0 \leq M \leq N$) are operating or active (i.e., in the process of conducting a telephone call). In one embodiment, system 100 employs a digital TDMA scheme, in which each operating handset only transmits or receives data during its own "time slice" or slot. System 100 thus provides a wireless network between the base station 110 and each handset $120_i$ ($1 \leq i \leq N$).

System 100 preferably employs block error coding to reduce error. In one embodiment, during a time slice, digitally compressed audio packets (such as ADPCM (adaptive differential pulse code modulation) samples) are transmitted, such as recommendation ITU-T G.721 or G.727 with a block code. This allows, for example, 16 ADPCM samples to be transmitted per audio packet. Block codes and ADPCM are preferred because of their low latency, which allows the wireless phone behavior to mimic that of a standard corded phone. Channel codes such as convolutional codes or turbo codes, or stronger source coding such as LPC (linear predictive coding), transform coding, or formant coding incur more delay, which makes the system less like the equivalent corded telephone. The receivers 112, 122 of the base unit and handsets employ a demodulator architecture, as described in further detail below with reference to FIGS. 4–6, which provides for improved acquisition of the carrier loops.

Figure 2:
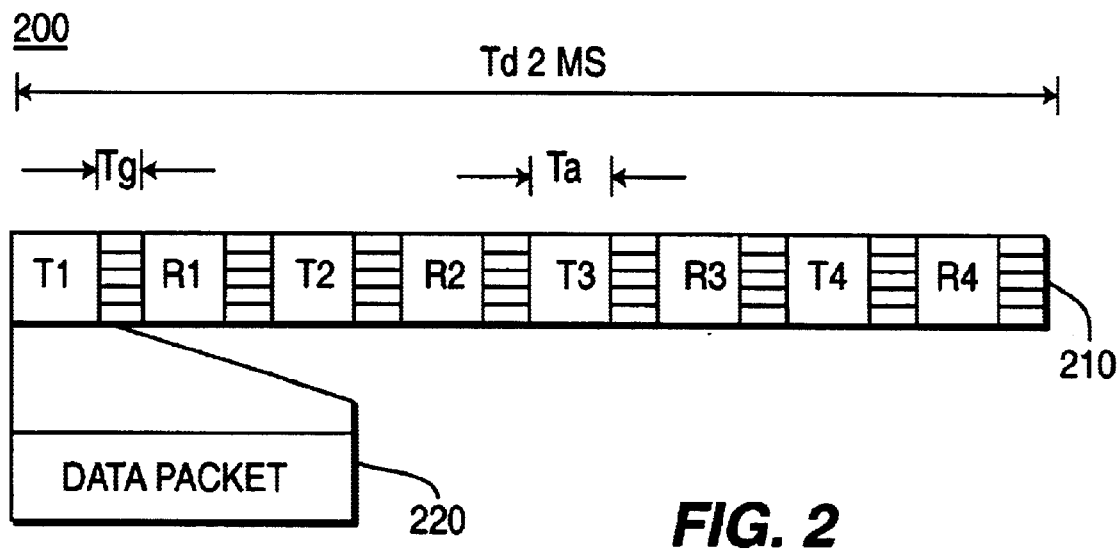
FIG. 2 is a schematic representation of the TDMA audio packet structure used in the digital wireless telephone system of FIG. 1, in accordance with an embodiment of the present invention.

Referring now to FIG. 2, there is shown a schematic representation of the TDMA audio packet structure 200 used in the digital wireless telephone system 100 of FIG. 1, in accordance with an embodiment of the present invention.

Structure 200 comprises a 2 ms (Td) field 210 of digital data, which comprises eight audio packets, such as audio packet 220. Each audio packet is a set of audio data transmitted either to a given handset from the base unit or vice-versa, during a given time-slice in an overall "epoch" scheme, during which time no other handsets receive or transmit data over the system's data channel. Each packet is labeled Ti or Ri, to indicate whether it is being trarsnitted from the base unit 110 or received by the base unit 110, to or from a given handset $120_i$.

In the present invention, during the 2 msec TDMA field cycle, voice data is exchanged in packets containing 16 samples of voice data. In one mode of operation of system 100, these samples are 4-bit ITU-T G.721 or G.727 ADPCM samples (i.e., a 32 Kbps ADPCM signal). By changing to G.727 3 or 2 bit ADPCM samples (24 or 16 Kbps ADPCM signals, respectively), an additional 16 or 32 bits are freed up for coding in each packet.

Figure 3:
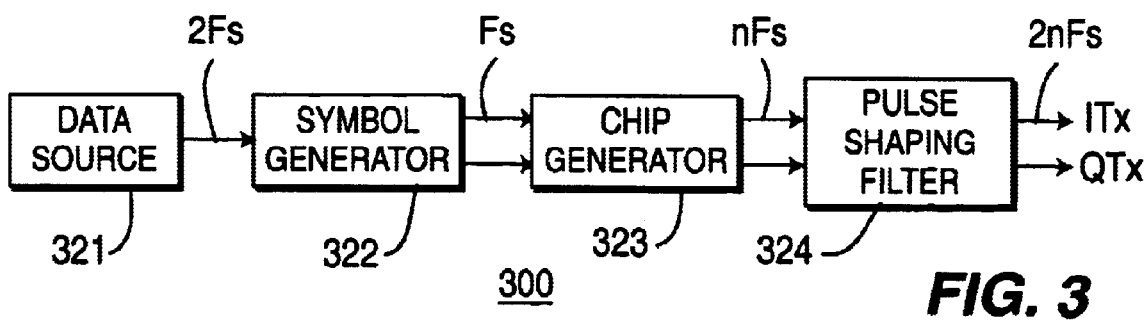
FIG. 3 is a block diagram illustrating a DSSS modulator and system sample rates employed in the transmitters of the system of FIG. 1.

In an embodiment, TDMA phone system is a QPSK DSSS system, in which the transmitters 111, 121 employ DSSS modulators and the receivers 112, 122 employ DSSS demodulators. Referring now to FIG. 3, there is shown is a block diagram illustrating a DSSS modulator 300 and system sample rates employed in the transmitters 111, 121 of TDMA system 100 of FIG. 1. The DSSS modulator 300 comprises a data source 321, a symbol generator 322, a chip generator 323, and a pulse shaping filter 324. The data and sampling rates, in terms of symbol rate Fs, are as shown in FIG. 3. Data source 321 provides data at two times the symbol rate, or 2Fs, and symbol generator 322 provides I and Q symbol pairs, each at the symbol rate Fs. Chip generator 323 multiplies each output of symbol generator 322 by a length n PN sequence. Thus, each symbol is transmitted by a string of n "sub-symbols" or "chips". Consequently, n chips are generated for each symbol, at a rate of nFs. The pulse shaping filter (PSF) 324 zero pads the data chips, and generates a signal at 2 samples per chip, or 2n samples/symbol, i.e at a rate of 2nFs. Thus, an analog analog RF signal is transmitted which itself represents the chips. In this manner, in a DSSS type system, a signal represents successive symbols, by means of successive chips.

At the receiver side, a received signal is sampled to provide samples. These samples represent a signal, which itself represents chips, which in turn represent symbols.

Figure 4:
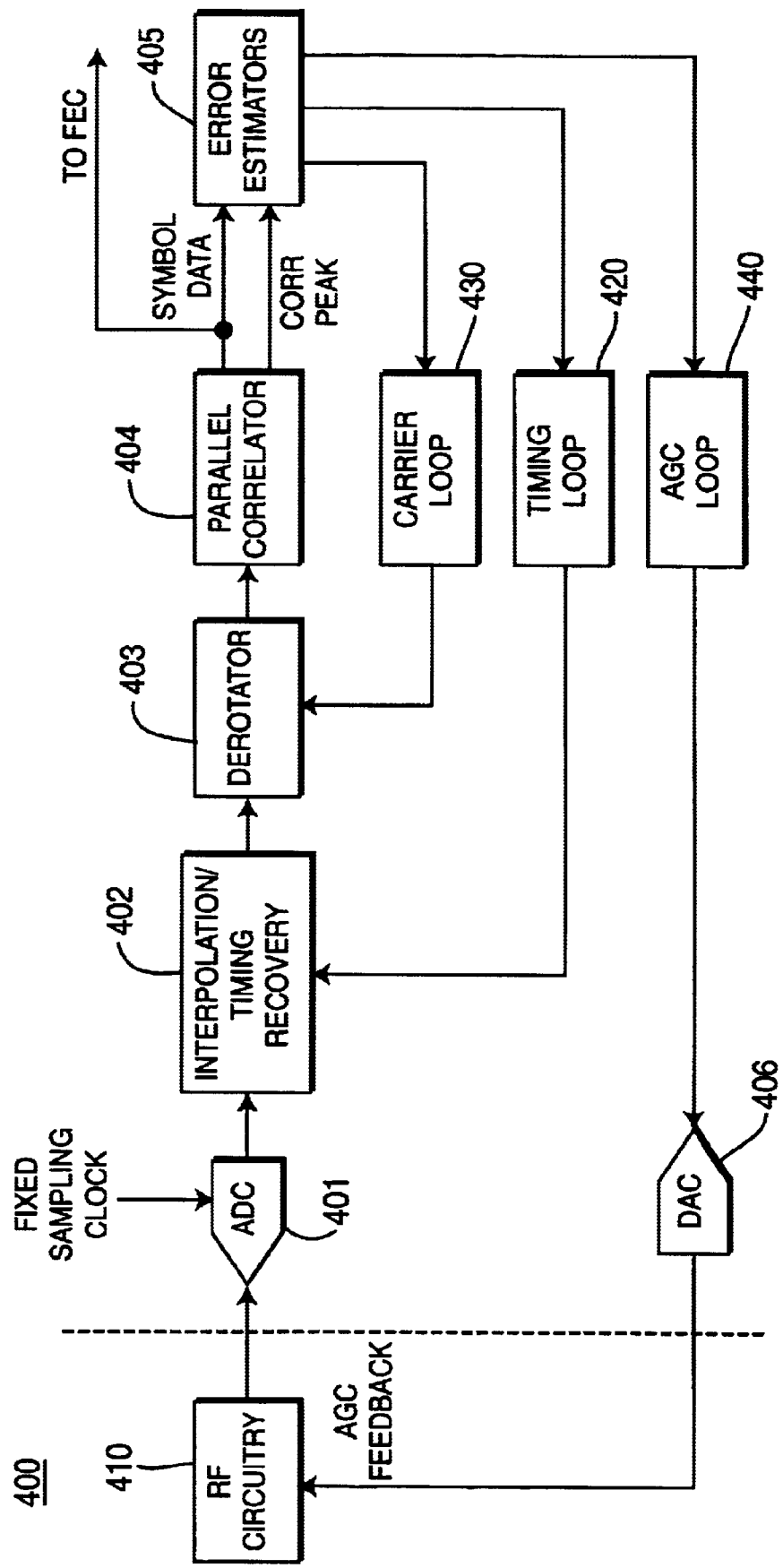
FIG. 4 is a block diagram illustrating a DSSS demodulator of the receivers of FIG. 1, in accordance with an embodiment of the present invention.

Referring now to FIG. 4, there is shown a block diagram illustrating a DSSS demodulator 400 of a receiver of the TDMA system 100 of FIG. 1, in accordance with an embodiment of the present invention. Demodulator 400 may be part of a receiver 122 of a handset or receiver 112 of base unit 110. Demodulator 400 comprises RF circuitry 410 for receiving the RF signal, in accordance with AGC feedback from DAC 406 and AGC loop 440, and for providing a near baseband signal to ADC 401. ADC 401 samples the near baseband signal using a fixed clock which is applied thereto at 2× chip rate, and thus provides a DSSS input signal. This signal is applied to an interpolation/timing recovery mechanism 402 which derives its error from the data past the parallel correlator. The output of interpolation/timing unit 402 is the near-baseband DSSS signal, rotating on the complex plane at the frequency difference between the actual RF carrier frequency and the frequencies of the oscillators in the receiver (which are used to control the demodulation). This signal is applied to derotator 403, which multiplies the rotating near-baseband signal by a rotation of opposite phase, in accordance with a counter-rotating signal, computed by the carrier tracking loop (CTL) 430 (a counter-rotating signal), which results in a signal at baseband without rotation. The feedback system of the carrier tracking loop 430 attempts to minimize phase error by generating the counter-rotating signal in NCO 433. CTL 430 generates this counter-rotating signal based on the CTL phase error received from error estimators 405. Derotator 403 thus presents a phase corrected signal to a correlator, such as parallel correlator 404.

The symbol stream at the output of parallel correlator 404 is applied to a forward error correction (FEC) system (not shown). The detection of the correlation peak (CORR PEAK) will be dependent on the incoming SNR (signal-to-noise ratio), signal level, and carrier and timing offset. Thus, the output of derorator 403 is applied to the input of parallel correlator 404, which provides output symbol data at the symbol rate to FEC circuitry (not shown), and also applies this symbol data and correlation peak (CORR PEAK) data to error estimators 405, which provide error signals for the carrier, timing, and AGC loops (i.e., CTL phase error, timing error, and AGC error signals), as will be appreciated, based on the output of the parallel correlator (i.e. either the symbol data and/or the CORR PEAK data).

As will be appreciated, timing error estimation for clock recovery is usually employed in communications systems. Conventional methods of timing recovery include a feedback control system to estimate the timing error based on the incoming signal and filter the error and drive a VCXO to adjust the phase of the locally generated clock. For example, decision timing error estimation is sometimes employed, using non-decision directed techniques like Gardner's algorithm, "A BPSK/QPSK Timing-Error Detector for Sampled Receivers," F. M. Gardner, IEEE *Trans. on Comm.*, May 1986, pp. 423–429. Decision directed techniques like the Müller and Mueller algorithm are also sometimes employed, "Timing Recovery in Digital Synchronous Data Receivers," K. H. Mueller & M. Müller, IEEE *Trans. on Comm.*, May 1976, pp. 516–530.

In the present invention, however, error estimators 405 use data generated from the parallel correlator 404 to track/adjust the timing, carrier offset, and AGC loops, so as to improve signal reception and recovery. In particular, interpolation/timing recovery 402 adjusts the sampling phase for symbol synchronization in accordance with timing feedback from timing loop 420; and derotator 403, which derotates the signal and frequency shifts the signal to baseband in accordance with carrier feedback from carrier loop or CTL 430. Derotator 403 thus presents a phase corrected signal to parallel correlator 404. Parallel correlator 404 provides symbol and correlation peak data to error estimators 405, as described in further detail below, based on which error estimators 405 adjust the demodulation parameters for control loops 430, 420, 440 to improve signal acquisition. Timing loop 420 is used to establish sampling synchronization at the receiver, so that sampling occurs at the proper time.

It is noted that the derorator 403, which is controlled by the CTL 430, is placed in front of parallel correlator 404, instead of after parallel correlator 404, and thus operates at a multiple of the chip rate, rather than at a multiple of the symbol rate. This advantageously allows for improved carrier tracking. The signal being corrected (derotated) in CTL 430 is a 2nFs rate (i.e., chip rate) signal, but the CTL phases errors are generated at symbol rate Fs. Thus, the derotated signal provided by derotator 403 precedes parallel correlator 403 in the demodulator 400 of a given receiver.

As will be appreciated, rapid rotation (>30 degrees per PN sequence period) with respect to the PN sequence length degrades correlation. Thus, the demodulator of the present invention forces all CTL-induced derotation to occur just after the boundary between symbols, which is near the boundary between correlations in the system. This provides two benefits: it reduces rotation of the signal into the parallel correlator 404 for better correlations, and it applies the CTL correction from the previous symbol immediately to the next symbol. By contrast, in traditional approaches in DSSS demodulators, the CTL correction is spread over each symbol period.

Figure 5:
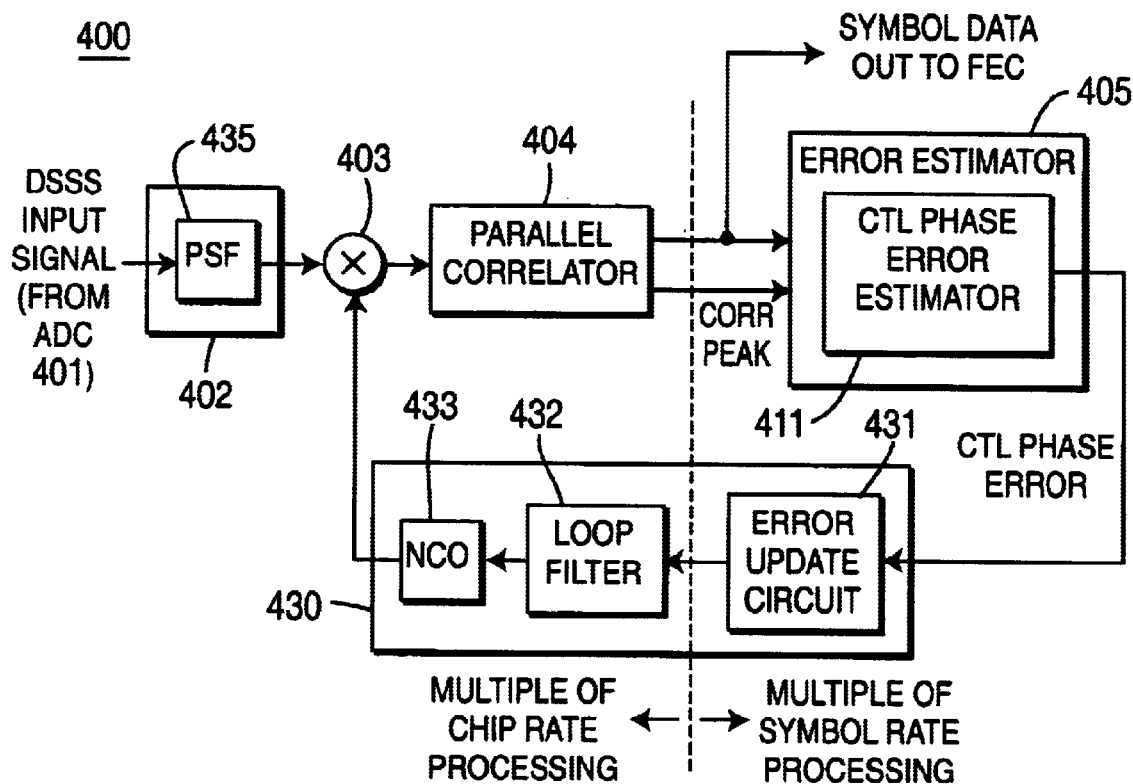
FIG. 5 is a block diagram illustrating the carrier tracking loop (CTL) aspect of the DSSS demodulator architecture of FIG. 4.

Referring now to FIG. 5, there is shown a block diagram illustrating the CTL aspect of the DSSS demodulator architecture 400 of FIG. 4. As shown in FIG. 5, all signal processing in components to the left of the dashed line occurs at a multiple of the chip rate 2nFs, while signal processing in components to the right of the dashed line occurs at a multiple of the symbol rate Fs. The DSSS input signal received from ADC 401 is applied to a PSF 435 of interpolation/timing recovery block 402, the output of which is provided to derorator 403, which is coupled as shown previously to the input of parallel correlator 404. The CTL phase error estimator subunit 411 of error estimators 405 receives the symbol data output by parallel correlator 404, and provides a CTL phase error signal to CTL 430. As shown, CTL 430 comprises an error update circuit 431, a loop filter 432, and NCO 433. In CTL 430, error update circuit 431 operates at the symbol rate, while loop filter 432 and NCO 433 operate at the chip rate.

In the present invention, demodulator 400 takes the CTL phase error, which is computed at the symbol rate, and applies it as a step error introduced at the beginning of each spreading sequence. In one embodiment, the error update circuit 431 implements this by enabling the registers of the loop filter 432 once per symbol, at the beginning of the spreading sequence immediately after the previous error is computed. Note that the gain of the loop filter 432 must be scaled by the PN sequence length, since there will be one filter update instead of 2n updates.

Figure 6:
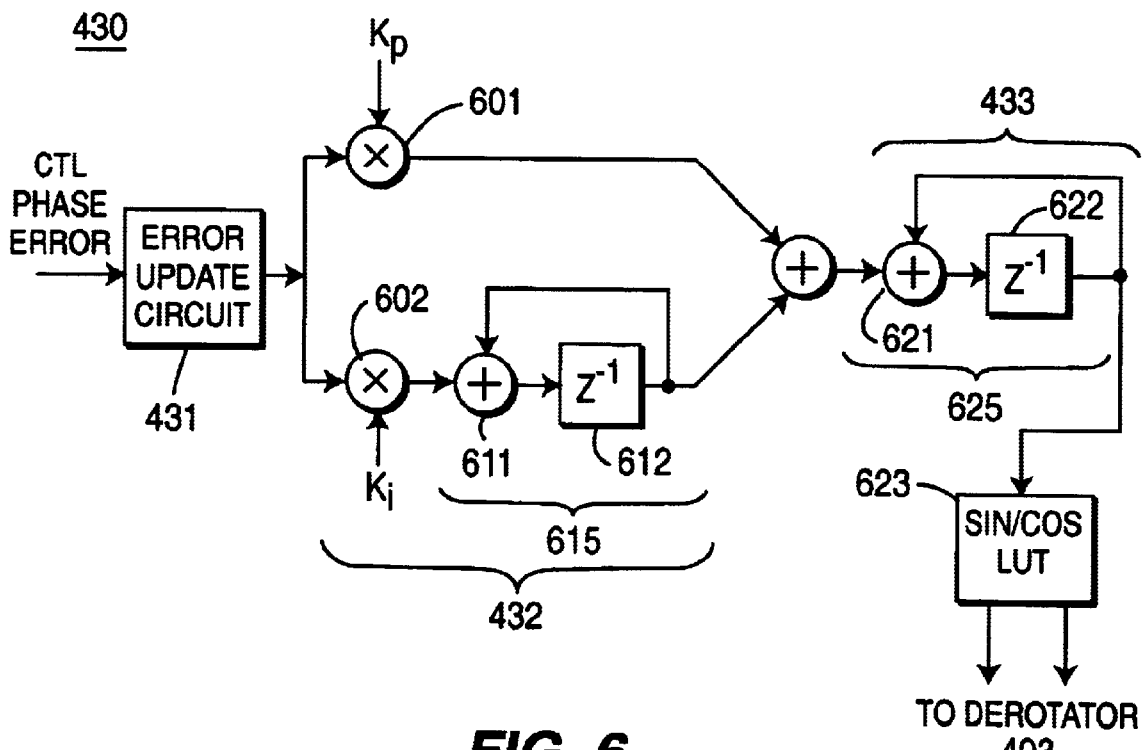
FIG. 6 is a block diagram showing the CTL of FIG. 5 in further detail.

Referring now to FIG. 6, there is shown a block diagram illustrating CTL 430 of FIG. 5 in further detail. In particular, FIG. 6 shows the loop filter 432 and NCO 433 in further detail. Loop filter 432 comprises rotators 601, 602, which receive signals kp, ki, respectively. Loop filter 432 is a standard second-order filter, combining kp times the error signal with ki times the integrated error signal. The constants kp, ki determine the loop stability and convergence time, and are thus initialized to values which help the loop acquire quickly while maintining stability. Increasing these values opens the bandwidth of the loop, allowing fast acquisition, while decreasing these constants reduces the bandwidth, which reduces the noise in the loop. A wider bandwidth may be employed for acquisition, and a narrower bandwidth may be employed for tracking once lock is established.

Loop filter 432 also comprises summer or adder 613, and a loop filter integrator 615 (adder 611 and delay unit 612, coupled with feedback as shown). NCO 433 comprises an NCO integrator 625 (adder 621 and delay unit 622) and SIN/COS look-up table (LUT) unit 623, which provides the counter-rotating signal (derotation control signal) to derorator 403.

CTL phase error is produced on a symbol-by-symbol basis. The DSSS system uses many chips to express a symbol. Rather than apply the phase error over all the chips which span a symbol, the phase error is applied to the loop filter over the period of 1 sample of the output of the timing recovery and pulse shaping block 402, which is operating at a multiple of chip rate.

Figure 7:
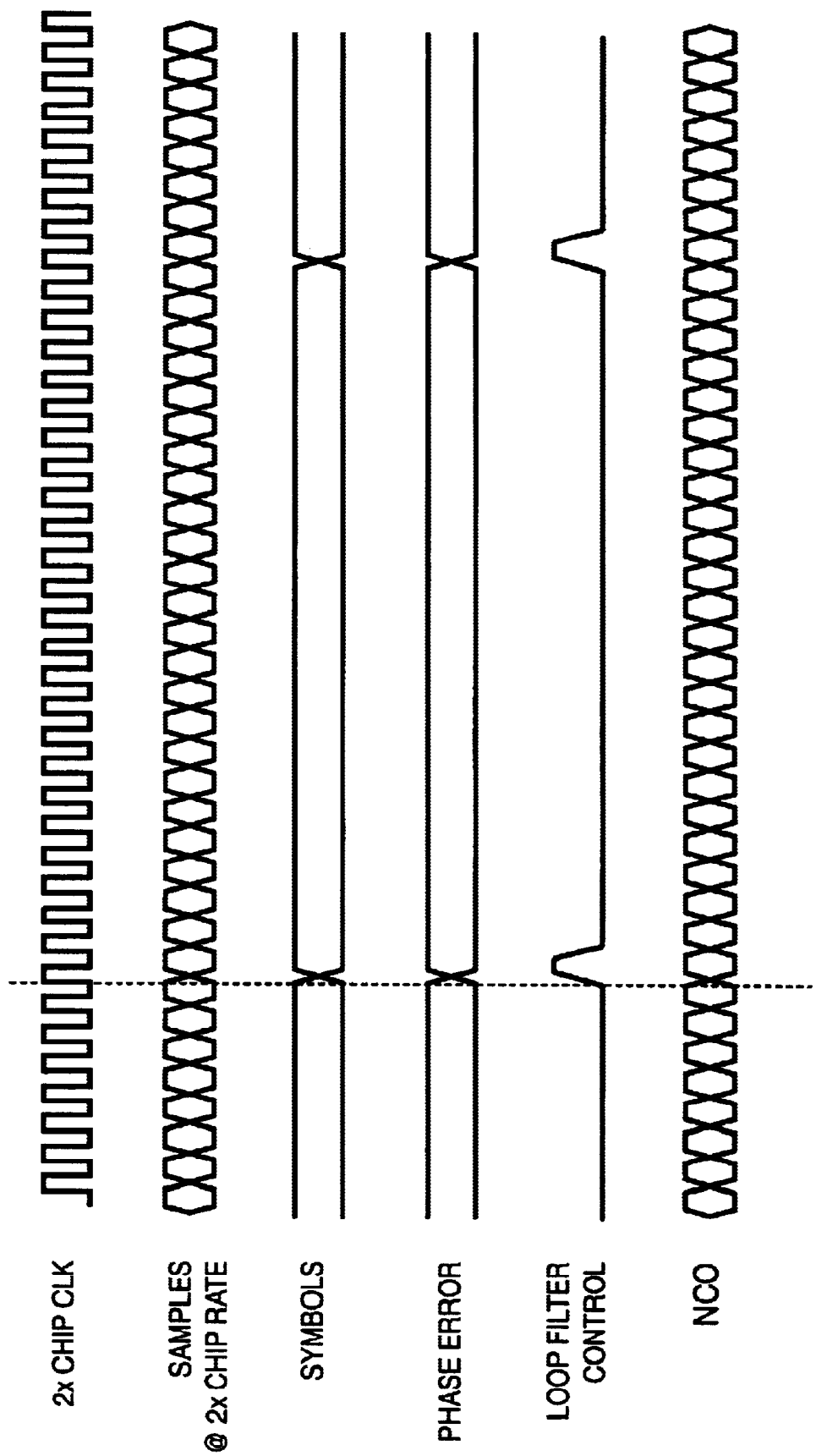
FIG. 7 is a timing diagram showing the timing relationships between various samples of the demodulator architecture of FIG. 4.

Referring now to FIG. 7, there is shown a timing diagram 700 showing the timing relationships between various samples of the demodulator architecture of FIG. 4. In particular, timing diagram 700 shows the relationship between samples from the timing recovery and pulse shaping block 402, symbols from parallel correlator 404, timing error from CTL phase error estimator 411, and the loop filter control and NCO outputs. Error update circuit 431 can be simply an AND gate on the bits composing the CTL phase error signal (from 411), forcing the loop filter and NCO (operating at a multiple of chip rate, as shown in the boundary in FIG. 5) to get error for only the first sample of each correlation when the PN sequence length is equal in duration to the symbol time.

Alternatively, the error update need only control the update of integrator 615, since the proportional error is a constant over the correlation period. This allows the NCO to change phase once at the beginning of the correlation sequence, and remain a stable oscillator for the remainder of the correlation sequence. Because of this, the correlator will see the frequency corrected samples for almost the entire correlation. If the error were instead applied over the entire correlation period, the oscillator would change frequency for each sample as integrator 615 accumulates error over the correlation period. This changing frequency will degrade the correlation performance compared to the step frequency change of the same magnitude.

Thus, in the present invention, the loop filter integrator 615 is updated once per PN sequence period, removing any changing rotation caused by moving the CTL correction frequency (the output of loop filter 432) to the desired place. The loop filter integrator 615 is preferably updated at the beginning of the PN sequence, so that the parallel correlator 404 will immediately benefit from the correction.

In the present invention, therefore, error from a decision-based CTL in the receiver's demodulator is used to update the chip rate oscillator (NCO 433, running at a multiple of chip rate) in one chip period as opposed to over the entire symbol period. This increases the likelihood of valid correlation over the next symbol period since the NCO of the CTL is not changing phase or frequency during the correlation period; instead, NCO changes occur between correlations.

Table 1 below compares the traditional CTL approach in DSSS receivers to three possible embodiments of the present invention.

TABLE 1

| CTL and Phase Error | Phase Error Estimate Generated at: | Loop Filter Integrator Clock | Loop Filter Integral Gain | Output Clock |
|---|---|---|---|---|
| Traditional approach: error is distributed over the symbol periods | Symbol rate | Chip rate or a multiple of chip rate | Ki | Chip rate or a multiple |
| Preferred embodiment of present invention: entire | Symbol rate | Enabled for one clock at | m*Ki | Chip rate or a |

TABLE 1-continued

| CTL and Phase Error | Phase Error Estimate Generated at: | Loop Filter Integrator Clock | Loop Filter Integral Gain | Output Clock |
|---|---|---|---|---|
| error is immediately applied, by enabling of loop filter integrator clock | | start of PN sequence | | multiple |
| Alternate embodiment of present invention: entire error is immediately applied by using delayed symbol clock | Symbol rate | Symbol clock delayed to capture previous error | m*Ki | Chip rate or a multiple |
| Alternate embodiment of present invention: entire error is immediately applied by shaping error to affect loop filter immediately | Generated at symbol rate, presented to loop filter as a single sample at chip rate with zero padding to fill PN sequence duration | Chip rate or a multiple | m*Ki | Chip rate or a multiple |

In Table 1, above, the loop filter integral gain is the scale factor which controls how much error from the CTL is integrated to estimate frequency offsets. For the traditional (conventional) approach, we assume that ki is selected so that it will result in stable operation. The traditional approach is the conventional approach described above, in which error is applied over the entire correlation period. For the other approaches, the error is taken in one sample clock at the multiple of the chip rate. Since there are m samples per symbol, the present invention provides m times the error that was provided in the conventional approach to the problem, when the loop is updated at 1/m the rate.

The output clock refers to the clock whcih updates the NCO (the output NCO block). In the "preferred embodiment" in Table 1, integrator 615 is enabled once at the beginning of the corrrelation period (at Loop Filter Control on timing diagram 700). Proportional error passes through unchanged. In the first alternative embodiment, the symbol clock or delayed symbol clock is used to operate the loop filter integrator. In the second alternative embodiment, the clock loop filter integrator is run at a multiple of chip rate (sample rate of output of interpolator/timing recovery block 402), but the gate error at the beginning of the correlation sequence (e.g., use the Loop Filter Control signal in timing diagram 700) operates as described above.

As will be appreciated, the CTL of the present invention is applicable to any DSSS receiver. In alternative embodiments, the present invention may be implemented in other types of DSSS systems, including TDMA, CDMA, and EDMA.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A receiver for receiving a spread-spectrum signal representing symbol data from a transmitter, the receiver comprising:

(a) a derotator that derotates the spread-spectrum signal in accordance with a counter-rotating signal to provide a derotated signal;

(b) a correlator for receiving the derotated signal and for providing output symbol data based on the derotated signal;

(c) a carrier tracking loop (CTL) phase error estimator for receiving the output symbol data and for generating a CTL phase error signal based upon the rotation of the spread-spectrum signal; and (d) a CTL for generating the counter-rotating signal based on the CTL phase error signal, wherein the CTL comprises an error update circuit operating at a multiple of the symbol rate, a loop filter operating at a multiple of the chip rate, and a numerically-controlled oscillator (NCO) operating at a multiple of the chip rate, and the CTL phase error generated by the CTL phase error estimator is computed at the symbol rate and is applied in the CTL as a step error introduced at the beginning of each spreding sequence.

2. The receiver of claim 1, further comprising:

RF circuitry for receiving an RF signal from the transmitter and for providing a near-baseband analog signal, in accordance with an automatic gain control (AGC) signal, basedon the RF signal;

an analog-to-digital converter (ADC) for sampling the near-baseband analog signal to provide a digital signal;

an interpolation/timing recovery unit for receiving the digital signal and for providing the spread-spectrum signal, in accordance with a timing signal;

an error estimator unit, comprising the CTL phase error estimator, for generating the CTL phase error signal, an AGC error signal, and a timing error signal based on the output of the correlator, wherein the correlator is a parallel correlator;

a timing loop for generating the timing signal based on the timing error signal; and an AGC loop for generating the AGC signal based on the AGC error signal.

3. The receiver of claim 1, wherein the spread-spectrum signal is a direct-sequence spread-spectrum (DSSS) signal.

4. The receiver of claim 3, wherein the DSSS signal is a time division multiple access (TDMA) DSSS signal.

5. The receiver of claim 3, wherein:

the correlator is a parallel correlator;

the DSSS signal represents a series of chips which represent symbols, wherein the DSSS signal is characterized by a chip rate and by a symbol rate;

the derotator and the correlator operate at a multiple of the chip rate; and the CTL phase error estimator operates at a multiple of the symbol rate.

6. The receiver of claim 1, wherein the error update circuit enables the loop filter once per symbol, at the beginning of a spreading sequence immediately after a previous error is computed, wherein the CTL phase error is used to update the NCO in a single chip period at the beginning of the spreading sequence.

7. The receiver of claim 1, wherein the receiver is a receiver of one of a plurality of transceivers of a wireless telephone system comprising:

a base transceiver having a base receiver; and a plurality of wireless handsets, each handset comprising a handset transceiver for establishing a wireless link over a shared channel with the base unit via the base transceiver, each handset transceiver having a handset receiver.

8. The receiver of claim 7, wherein the wireless link is a time-division multiple access (TDMA) link, in which each handset communicates during an exclusive time slot of a TDMA scheme that allocates time slots to handsets.

9. The receiver of claim 8, wherein a plurality of adaptive differential pulse code modulation (ADPCM) data samples are transmitted during each time slot.

* * * * *